US009299257B2

(12) United States Patent
Beaurepaire et al.

(10) Patent No.: US 9,299,257 B2
(45) Date of Patent: Mar. 29, 2016

(54) METHOD AND APPARATUS FOR DETERMINING PARKING LOCATION BASED ON DEPARTURE TIME INFORMATION

(71) Applicant: HERE Global B.V., Veldhoven (NL)

(72) Inventors: Jerome Beaurepaire, Berlin (DE); Ari Aarnio, Espoo (FI)

(73) Assignee: HERE Global B.V., Veldhoven (NL)

( * ) Notice: Subject to any disclaimer, the term of this patent is extended or adjusted under 35 U.S.C. 154(b) by 122 days.

(21) Appl. No.: 13/857,733

(22) Filed: Apr. 5, 2013

(65) Prior Publication Data

US 2014/0302875 A1 Oct. 9, 2014

(51) Int. Cl.
G08G 1/14 (2006.01)
G01C 21/36 (2006.01)

(52) U.S. Cl.
CPC ............ G08G 1/144 (2013.01); G01C 21/3685 (2013.01); G08G 1/143 (2013.01)

(58) Field of Classification Search
CPC ..... G08G 1/144; G08G 1/143; G01C 21/3685
USPC ......... 455/456.1–456.6, 418–420, 41.1–41.3, 455/569.2
See application file for complete search history.

(56) References Cited

U.S. PATENT DOCUMENTS

| 6,370,471 | B1 | 4/2002 | Lohner et al. | |
|---|---|---|---|---|
| 6,820,709 | B1 | 11/2004 | Zimmermann et al. | |
| 2002/0077953 | A1* | 6/2002 | Dutta ............................. | 705/37 |
| 2003/0112154 | A1 | 6/2003 | Yoakum et al. | |
| 2006/0228197 | A1* | 10/2006 | Springwater .................. | 414/231 |
| 2010/0198498 | A1 | 8/2010 | Jansen | |
| 2010/0318290 | A1 | 12/2010 | Kaplan et al. | |
| 2011/0133957 | A1 | 6/2011 | Harbach et al. | |
| 2012/0062395 | A1 | 3/2012 | Sonnabend et al. | |
| 2012/0299749 | A1* | 11/2012 | Xiao et al. ................. | 340/932.2 |
| 2012/0326893 | A1 | 12/2012 | Glezerman | |
| 2014/0058711 | A1* | 2/2014 | Scofield ........................... | 703/6 |

FOREIGN PATENT DOCUMENTS

| DE | 3739159 A1 | 6/1989 |
|---|---|---|
| EP | 1408455 A2 | 4/2004 |
| JP | 2009-20616 A | 1/2009 |

(Continued)

OTHER PUBLICATIONS

B. Yan-Zhong et al., "A Parking Management System Based on Wireless Network," Acta Automatica Sinica, Nov. 2006, vol. 32, No. 6, pp. 968-977.

(Continued)

Primary Examiner — Brandon Miller
(74) Attorney, Agent, or Firm — Ditthavong & Steiner, P.C.

(57) ABSTRACT

An approach is provided for determining departure time information for at least one vehicle, wherein the departure time is determined prior to an arrival of the at least one vehicle at the at least one parking facility. The approach also involves determining other departure time information for one or more other vehicles parked at the at least one parking facility. The approach further involves processing and/or facilitating a processing of the departure time information and/or the other departure time information to determine at least one parking location for that at least one vehicle at the least one parking facility.

20 Claims, 15 Drawing Sheets

(56) References Cited

FOREIGN PATENT DOCUMENTS

WO            2013038198 A2     3/2013
WO     WO 2013/038198 A2 *    3/2013   ............. G01C 21/20

OTHER PUBLICATIONS

Nouveliere, L. et al. "Experimental Vehicle Longitudinal Control using Second Order Sliding Modes." <http://ieeexplore.ieee.org/xpl/mostRecentIssue.jsp?punumber=8775> Date of Conference: Jun. 4-6, 2003, Published in American Control Conference, 2003, Proceedings of the 2003 (vol. 6), pp. 4705-4710. ISSN: 0743-1619.

LaPINE, C. "How Traffic Jam Assistance Systems Work." <http://auto.howstuffworks.com/car-driving-safety/safety-regulatory-devices/traffic-jam-assistance-systems1.htm>.

Nissan Motor Co., Ltd. "Intelligent Cruise Control (with Low-speed Following Capability)." <http://www.nissan-global.com/EN/DOCUMENT/PDF/TECHNOLOGY/TECHNICAL/intelligent_en.pdf>.

European Search Report for corresponding European Patent Application No. 14159792.2, dated Jul. 21, 2014, 12 pages.

* cited by examiner

METHOD AND APPARATUS FOR DETERMINING PARKING LOCATION BASED ON DEPARTURE TIME INFORMATION

BACKGROUND

Service providers and device manufacturers (e.g., wireless, cellular, etc.) are continually challenged to deliver value and convenience to consumers by, for example, providing compelling network services. One area of development has been the use of location-based services for providing the users of mobile devices with driving assistant services to improve the quality of their travels. However, at present there is no service where parking information is used to help users in selecting a parking location based on the time of departure for vehicles associated with at least one parking facility. Accordingly, service providers and device manufacturers face significant technical challenges in providing a service that takes into account the planned departure time for vehicles to determine the most suitable parking location for the vehicles.

SOME EXAMPLE EMBODIMENTS

Therefore, there is a need for an approach for determining at least one parking location for at least one vehicle at the at least one parking facility based, at least in part, on departure time information for one or more vehicles.

According to one embodiment, a method comprises determining departure time information for at least one vehicle, wherein the departure time is determined prior to an arrival of the at least one vehicle at the at least one parking facility. The method also comprises determining other departure time information for one or more other vehicles parked at the at least one parking facility. The method further comprises processing and/or facilitating a processing of the departure time information, the other departure time information, or a combination thereof to determine at least one parking location for that at least one vehicle at the at least one parking facility.

According to another embodiment, an apparatus comprises at least one processor, and at least one memory including computer program code for one or more computer programs, the at least one memory and the computer program code configured to, with the at least one processor, cause, at least in part, the apparatus to determine departure time information for at least one vehicle, wherein the departure time is determined prior to an arrival of the at least one vehicle at the at least one parking facility. The apparatus is also caused to determine other departure time information for one or more other vehicles parked at the at least one parking facility. The apparatus is further caused to process and/or facilitate a processing of the departure time information, the other departure time information, or a combination thereof to determine at least one parking location for that at least one vehicle at the at least one parking facility.

According to another embodiment, a computer-readable storage medium carries one or more sequences of one or more instructions which, when executed by one or more processors, cause, at least in part, an apparatus to determine departure time information for at least one vehicle, wherein the departure time is determined prior to an arrival of the at least one vehicle at the at least one parking facility. The apparatus is also caused to determine other departure time information for one or more other vehicles parked at the at least one parking facility. The apparatus is further caused to process and/or facilitate a processing of the departure time information, the other departure time information, or a combination thereof to determine at least one parking location for that at least one vehicle at the at least one parking facility.

According to another embodiment, an apparatus comprises means for determining departure time information for at least one vehicle, wherein the departure time is determined prior to an arrival of the at least one vehicle at the at least one parking facility. The apparatus also comprises means for determining other departure time information for one or more other vehicles parked at the at least one parking facility. The apparatus further comprises means for processing and/or facilitating a processing of the departure time information, the other departure time information, or a combination thereof to determine at least one parking location for that at least one vehicle at the at least one parking facility.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining at least one parking location for at least one vehicle at the at least one parking facility based, at least in part, on departure time information for one or more vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
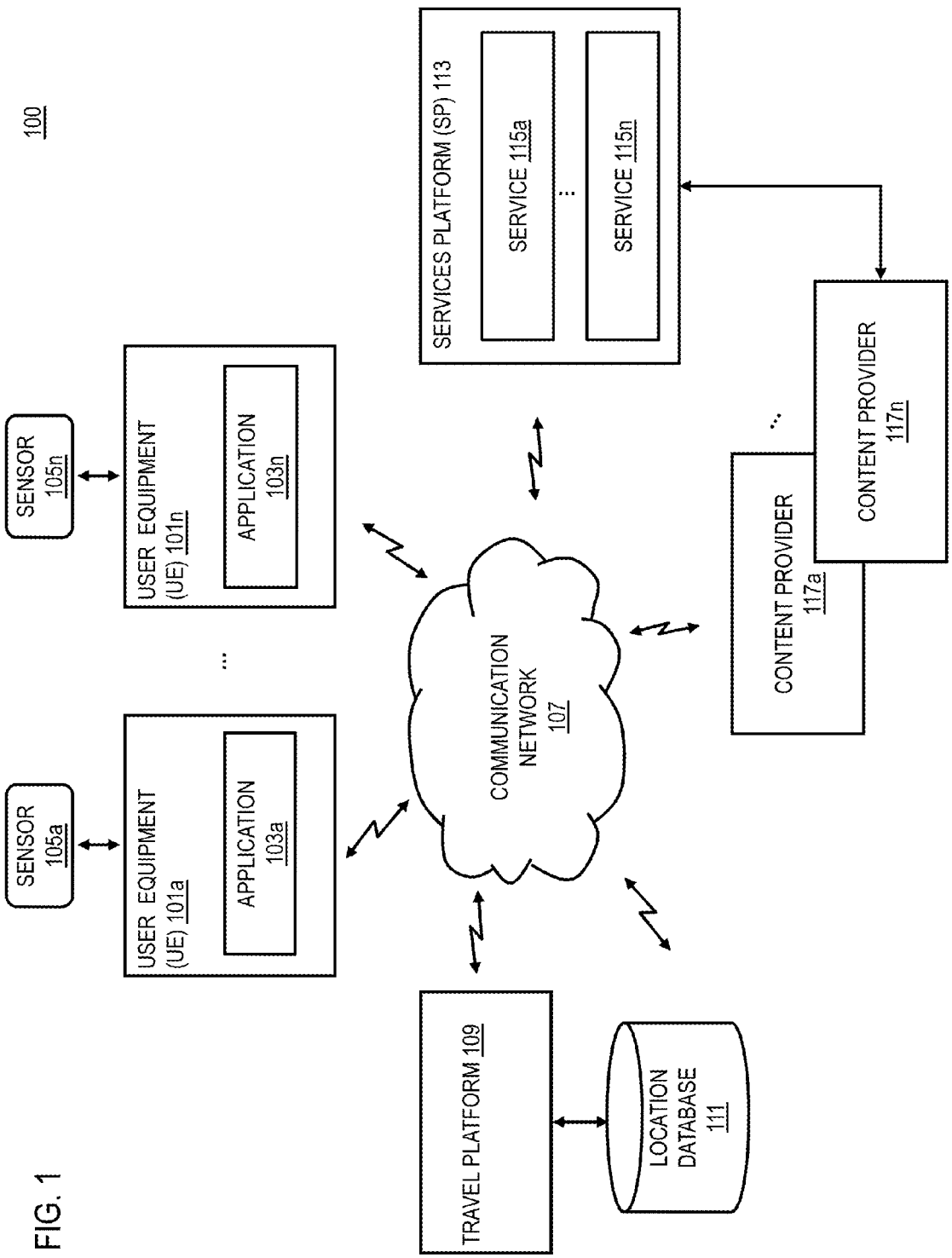
FIG. 1 is a diagram of a system capable of determining at least one parking location for at least one vehicle at the at least one parking facility based, at least in part, on departure time information for one or more vehicles, according to one embodiment.

FIG. 1 is a diagram of a system capable of determining at least one parking location for at least one vehicle at the at least one parking facility based, at least in part, on departure time information for one or more vehicles, according to one embodiment. The service providers and device manufacturers (e.g., wireless, cellular, etc.) are continually challenged to provide compelling network services, that may include, optimizing the parking of cars by helping users to select parking location next to users planning to leave before, around the same time or little after them. As mentioned, it is becoming increasingly popular for service providers and device manufacturers to make available navigation and/or mapping services on an array of mobile devices. However, there is a lack of services that provides information about suitable parking location associated with one or more parking facility. By way of example, a user may want to travel to a destination to attend an event, when attending an event parking always becomes a problem. The user can first enter the address of the destination into a navigation application associated with a mobile device (e.g., mobile phone) using the user interface (UI) of the mobile device. The navigation application may then provide the user with turn-by-turn navigation to assist the user to drive from a starting point of interest (e.g., a home or office) to the destination (e.g., a restaurant). However, the navigation application is unable to determine a suitable parking location for the users in one or more parking facility associated with the event destination, for instance, a suitable parking location may be an area that is readily available when the user reaches a parking facility and does not block the user's path at the time he/she is departing a parking facility. In one scenario, a user may want to visit XYZ venue to attend an event, whereby the user may park by order of his/her arrival and when the user needs to leave the event, he/she needs to ask other drivers blocking his/her path to move their respective cars in order for the user to leave. This process is annoying and time consuming.

To address this problem, a system 100 of FIG. 1 introduces the capability of determining at least one parking location for at least one vehicle at the at least one parking facility based, at least in part, on departure time information for one or more vehicles. According to one embodiment, the system 100 may initially determine one or more parking location that are already correlated with one or more parking facility based, at least in part, on parking information contained within one or more databases, available from one or more mapping and/or navigation services, or a combination thereof. Then, the system 100 may determine departure time information for one or more vehicles that may be parked and/or vehicles that are parked at the one or more parking facility. Subsequently, system 100 recommends a parking location to the users based on such determination. In another embodiment, the system 100 may need to determine parking information for one or more destinations not already contained within the one or more databases, available from the one or more mapping and/or navigation services, or a combination thereof. In this instance, the system 100 first determines one or more trace results associated with GPS receivers within a mobile device (e.g., a mobile phone) during one or more travel paths between a starting point of interest (e.g., a home or office) and one or more destinations. The system 100 then analyzes the one or more trace results to correlate the one or more destination with one or more parking facility in close proximity to the one or more destinations.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a travel platform 109 via the communication network 107. In one embodiment, the travel platform 109 performs one or more functions associated with determining at least one parking location for at least one vehicle at the at least one parking facility based, at least in part, on departure time information for one or more vehicles.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for travel platform 109 and perform one or more functions associated with the functions of the travel platform 109 by interacting with the travel platform 109 over communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), peer to per (P2P) etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the travel platform 109 may be a platform with multiple interconnected components. The travel platform 109 may include multiple servers, intelligent networking devices, computing devices, components and corresponding software for determining at least one parking location for at least one vehicle at the at least one parking facility based, at least in part, on departure time information for one or more vehicles. In addition, it is noted that the travel platform 109 may be a separate entity of the system 100, a part of the one or more services 115 of the service platform 113, or included within the UE 101 (e.g., as part of the applications 103).

By way of example, when a user plans a route to the one or more destinations (e.g., entering the name or address of the one or more destinations into a navigation application) the travel platform 109 may query the user regarding the departure time information, in order for the travel platform 109 to determine the departure time prior to an arrival of the at least one vehicle at the at least one parking facility. In one embodiment, the travel platform 109 determines departure time information for one or more other vehicles parked at the at least one parking facility. The travel platform 109 causes an establishment of a communication session among the at least one vehicle and/or at least one device associated with the at least one vehicle and/or the one or more other vehicles and/or one or more other devices associated with the one or more other vehicles, querying for their departure time information. The travel platform 109 then processes the departure time information and/or the other departure time information to determine at least one parking location at the at least one parking facility. The determination of the parking location is further based, at least in part, on the occurrence of arrival of the at least one vehicle at the least one parking facility. In one scenario, the travel platform 109 may recommend to at least one user a time of arrival at the at least one parking facility, such recommendation may be based, at least in part, on the departure time information provided by the at least one user.

In one scenario, a user may be driving to XYZ destination, whereby the travel platform 109 determines that the at least one vehicle is within a predetermined distance and/or a predetermined time of arrival from the at least one parking facility, and causes a presentation of at least one message requesting the departure time information. The travel platform 109 may determine based, at least in part, on the departure information obtained for the one or more vehicles that certain vehicles may leave earlier than other vehicles. As a result, the travel platform 109 may cause, at least in part, the presentation and/or recommendation of a parking location minimizing the blocking of the one or more other vehicles parked at the at least one location that have departure times earlier than that at least one vehicle as indicated by the departure time information.

In one embodiment, the travel platform 109 determines a parking location correlated with at least one parking facility for one or more users, whereby the travel platform 109 causes a presentation of one or more guides for locating the at least one parking location, wherein the one or more guides indicate, a direction and/or an orientation associated with the at least one parking location. In one scenario, the travel platform 109 determines the availability of a parking location based, at least in part, on the departure information, and causes a generation of a recommendation of at least one alternate parking location based, at least in part, on the departure time information.

In one embodiment, the location databases 111 may include one or more contexts, one or more parameters, or a combination thereof associated with one or more parking location and the one or more parking facility. By way of example, the travel platform 109 may use the one or more contexts, the one or more parameters, or a combination thereof stored within the location databases 111 to determine one or more relationships between the one or more parking location and the one or more parking facility. More specifically, the travel platform 109 may use the one or more contexts, the one or more parameters, or a combination thereof to determine a hierarchy (e.g., in terms of departure information of one or more vehicles) of the one or more parking location related to the one or more parking facility. As previous discussed, the UEs 101 may utilize location-based technologies (GPS receivers, cellular triangulation, A-GPS, etc.) to determine location and temporal information regarding the UEs 101. For instance, the UEs 101 may include GPS receivers to obtain geographic coordinates to determine the current location and time associated with the UEs 101. In one scenario, the travel platform 109 may determine the one or more trace results associated with GPS receivers within a mobile device (e.g., a mobile phone). The travel platform 109 then correlates the one or more trace results with the one or more speed profiles stored in the location databases 111 to segment the one or more travel paths into at least one driving segment. In one embodiment, the location databases 111 also include location-based information (e.g., geo-coded coordinates) associated with one or more parking location and/or one or more parking facility, which the travel platform 109 can use to determine whether the end of the at least one driving segment is a parking location and the at least one parking facility, respectively, already stored within the one or more location databases 111.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the travel platform 109 and the content providers 117 to supplement or aid in the processing of the content information. In one embodiment, the travel platform 109 and the services platform 113 may also run in UE 101.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the travel platform 109 with travel information of the one or more geo-routes and/or location anchors, etc.

The content providers 117 may provide content to the UE 101, the travel platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining parking location for one or more parking facility. In one embodiment, the content providers 117 may also store content associated with the UE 101, the travel platform 109, and the services 115 of the services platform 113. In another embodiment, the content providers 117 may manage access to a central repository of data, and offer a consistent, standard interface to data, such as a repository of users' navigational data content.

By way of example, the UE 101, the travel platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
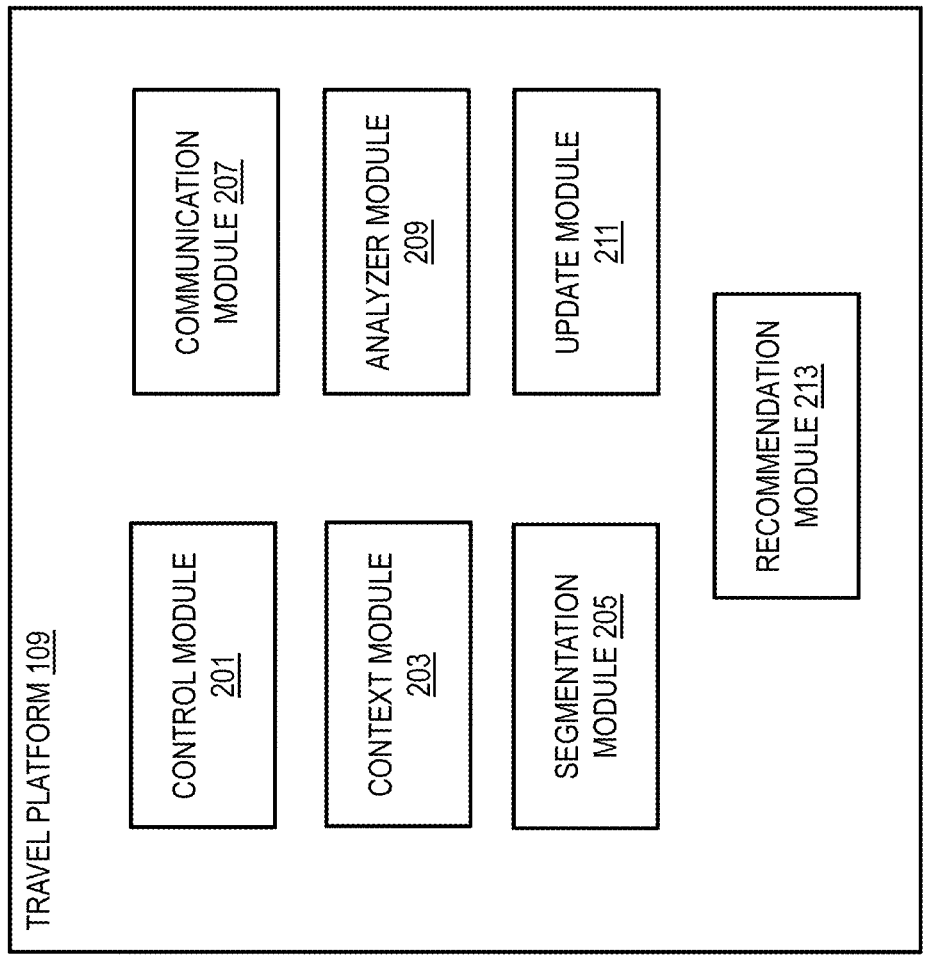
FIG. 2 is a diagram of the components of travel platform 109, according to one embodiment.

FIG. 2 is a diagram of the components of the travel platform 109, according to one embodiment. By way of example, the travel platform 109 includes one or more components for determining at least one parking location for at least one vehicle at the at least one parking facility based, at least in part, on departure time information for one or more vehicles. It is contemplated that the functions of these components may be combined in one or more components or performed by other components of equivalent functionality. In this embodiment, the travel platform 109 includes a control module 201, a context module 203, a segmentation module 205, a communication module 207, an analyzer module 209, an update module 211, and a recommendation module 213.

The control module 201 executes at least one algorithm for executing functions of the travel platform 109. For example, the control module 201 may execute an algorithm for processing a query associated with a UE 101 for determining departure time information from at least one parking facility. By way of another example, the control module 201 may execute an algorithm to interact with the context module 203 to determine the geographic or temporal context of a UE 101. The control module 201 also may execute an algorithm to interact with the segmentation module 205 to cause a segmentation of one or more travel paths to determine at least one driving segment based, at least in part, on one or more speed profiles associated with the one or more travel paths. The control module 201 may also execute an algorithm to interact with the communication module 207 to communicate among applications 103, the travel platform 109, the services platform 113, content providers 117, and the location databases 111. The control module 201 also may execute an algorithm to interact with the analyzer module 209 to analyze one or more travel paths, one or more parking location, one or more destinations, one or more parking facility or a combination thereof.

The context module 203 may determine the geographic or temporal context of a UE 101 by utilizing location-based technologies (GPS receivers, cellular triangulation, A-GPS, etc.) to determine location (e.g., geographic coordinates) and temporal information (e.g., speed) regarding a UE 101 during one or more travel paths between a starting point of interest (e.g., a home or office) and one or more parking facility. The context module 203 may also identify whether certain conditions or triggers have been met, such as whether a particular event has occurred (e.g., initiation of a travel to one or more parking facility. The context module 203, in connection with the segmentation module 205, is also used to determine the location of the one or more parking location, one or more parking facility, one or more destinations, or a combination thereof. Further, the context module 203 may determine to store the one or more travel paths, the one or more parking location, one or more parking facility, the one or more destinations, or a combination thereof within the one or more location databases 111.

The segmentation module 205 segments one or more travel paths to determine at least one driving segment. In one embodiment, the segmentation module 205 processes one or more travel paths determined by the GPS sensors associated with a mobile device (e.g., a mobile phone) to determine the at least one driving segment based, at least in part, on a speed profile associated with one or more vehicles and stored within the one or more location databases 111. By way of example, if the segmentation module 205 determines that the one or more travel paths indicate an average speed normally associated with driving, the segmentation module 205 in connection with context module 203 may identify whether certain conditions have been met, for instance, whether a user have left the starting point of interest (e.g., a home or office) to reach the one or more parking facility associated with one or more destinations (e.g., a restaurant) on time.

The communication module 207 is used for communication between the applications 103, the travel platform 109, the services platform 113, content providers 117, and the location databases 111. The communication module 207 may be used to communicate commands, requests, data, etc. By way of example, the communication module 207 may be used to transmit a request from a user interface (UI) of a UE 101 to obtain location-based information (e.g., departure time information) for one or more parking facility. In one embodiment, the communication module 207 is used to present a user with location-based information obtained from one or more location databases 111 regarding one or more parking location associated with one or more parking facility. By way of example, if location-based information related to one or more parking facility and/or one or more related parking location is unavailable from the location database 111, the communication module 207, in connection with the segmentation module 205 and the analyzer module 209, can be used to transmit the location-based information to the location databases 111 for future reference. The communication module 207, in connection with the analyzer module 209, can also be used to present to a user a recommended parking location as the best parking option based, at least in part, on the estimated time of departure. In one embodiment, the communication module 207 establishes a communication session among one or more vehicles associated with at least one parking facility querying for departure time information.

The analyzer module 209 is used to process one or more trace results associated with a mobile device (e.g., GPS traces) during one or more travel paths between a starting point of interest (e.g., a home or office) and one or more destinations (e.g., a restaurant, a cinema, a stadium, etc.). The analyzer module 209 then analyzes the one or more trace results to correlate one or more destinations with one or more parking location associated with one or more parking facility. In one embodiment, the analyzer module 209 is unable to determine a correlation between one or more parking facility and one or more parking location within the location databases 111. In this instance, the analyzer module 209, in connection with the segmentation module 205, is used to determine at least one driving segment of the one or more travel paths based, at least in part, on a speed profile associated with one or more modes of travel (e.g., cars, trucks, etc.) and stored within the location databases 111.

The update module 211 may work with the context module 203 and the recommendation module 213 to cause, at least in part, an update of the at least one departure information, the one or more context, or a combination thereof periodically, according to a schedule, on demand, or a combination thereof for a predetermined period prior to and/or during and/or after a commencement of travel.

In addition, the context module 203 may work with the recommendation module 213 to generate a recommendation to a user of at least one alternate parking location based, at least in part, on travel information obtained by the context module 203 for a predetermined period prior to, during, or after a user's commencement of travel. In particular, the context module 203 and the recommendation module 213 may work together in order to monitor location information associated with the UEs 101 while traveling to the one or more destinations. In addition, the recommendation module 213 may also cause a presentation to the user of a recommendation associated with the at least one of the user's one or more travel paths, the user's one of more destinations, one or more parking locations, one or more parking facility or a combination thereof.

Figure 3:
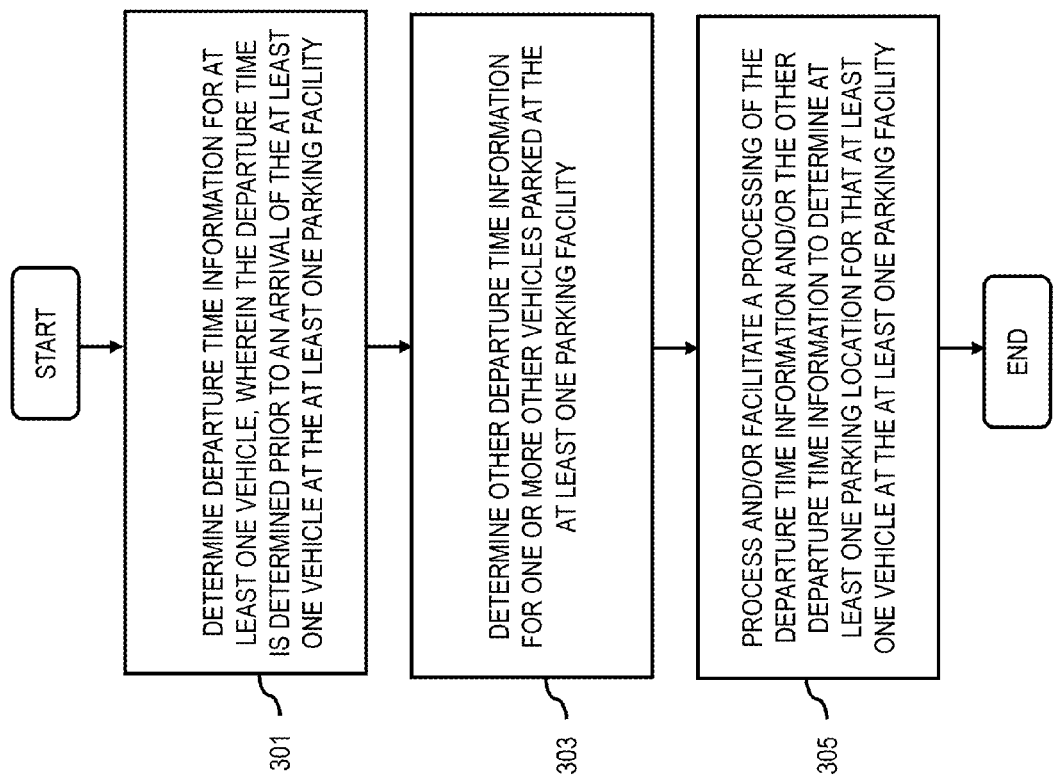
FIGS. 3-7 are flowcharts of processes for determining at least one parking location for at least one vehicle at the at least one parking facility based, at least in part, on departure time information for one or more vehicles, according to various embodiments.
Figure 13:
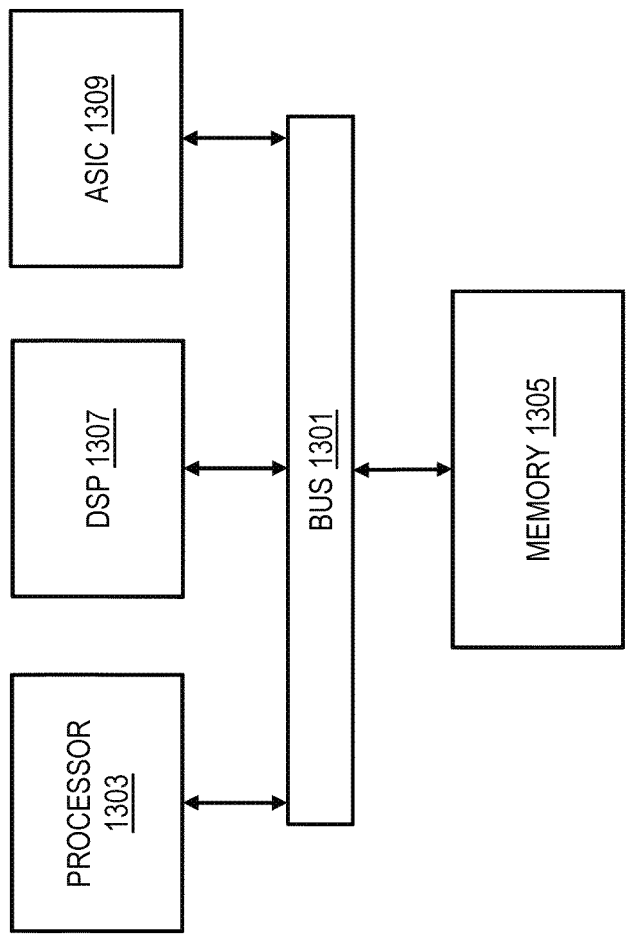
FIG. 13 is a diagram of a chip set that can be used to implement an embodiment of the invention.

FIG. 3 is a flowchart of a process for determining at least one parking location for at least one vehicle at the at least one parking facility based, at least in part, on departure time information for one or more vehicles, according to one embodiment. In one embodiment, the travel platform 109 performs the process 300 and is implemented in, for instance, a chip set including a processor and a memory as shown in FIG. 13.

In step 301, the travel platform 109 determines departure time information for at least one vehicle, wherein the departure time is determined prior to an arrival of the at least one vehicle at the at least one parking facility. In one scenario, the travel platform 109 determines a request by a user to initiate route calculation to at least one destination, whereby the travel platform 109 processes and/or facilitates a processing of the one or more travel arrangements for one or more users to determine an estimated time of departure from the at least one parking facility. The travel platform 109 may use the departure information to arrange the most suitable parking location for the vehicle based, at least in part, on the departure information.

In step 303, the travel platform 109 determines other departure time information for one or more other vehicles parked at the at least one parking facility. In one scenario, a driver arrives to the at least one destination, where he/she may further be assisted to a parking facility. There may be an area plan of one or more parking location in the parking facility for the driver to park his/her vehicle. The travel platform 109 communicates with one or more vehicles parked at the at least one parking facility in relation to their time of departure from the parking facility to make parking location available for other vehicles arriving at the at least one parking facility. The travel platform 109 determines the most suitable parking location for the driver based at least in part on the departure time information, ensuring that the parked vehicles leaves the parking facility without any disturbance.

In step 305, the travel platform 109 processes and/or facilitates a processing of the departure time information and/or the other departure time information to determine at least one parking location for that at least one vehicle at the least at one parking facility. In one scenario, the travel platform 109 monitors the travel status for at least one vehicles and/or the one or more other vehicles, thereby updating the parking availability and/or the departure time information periodically, according to a schedule, on demand, or a combination thereof for a predetermined period prior to and/or during and/or after a commencement of travel. In one scenario, a user may drive to XYZ destination whereby the travel platform 109 may determine the departure time information for the vehicle, on the other hand, the travel platform 109 may determine the departure time information for the other vehicles parked at the at least one parking facility to arrange the most suitable parking location for the arriving vehicle based, at least in part, on the departure time information.

Figure 4:
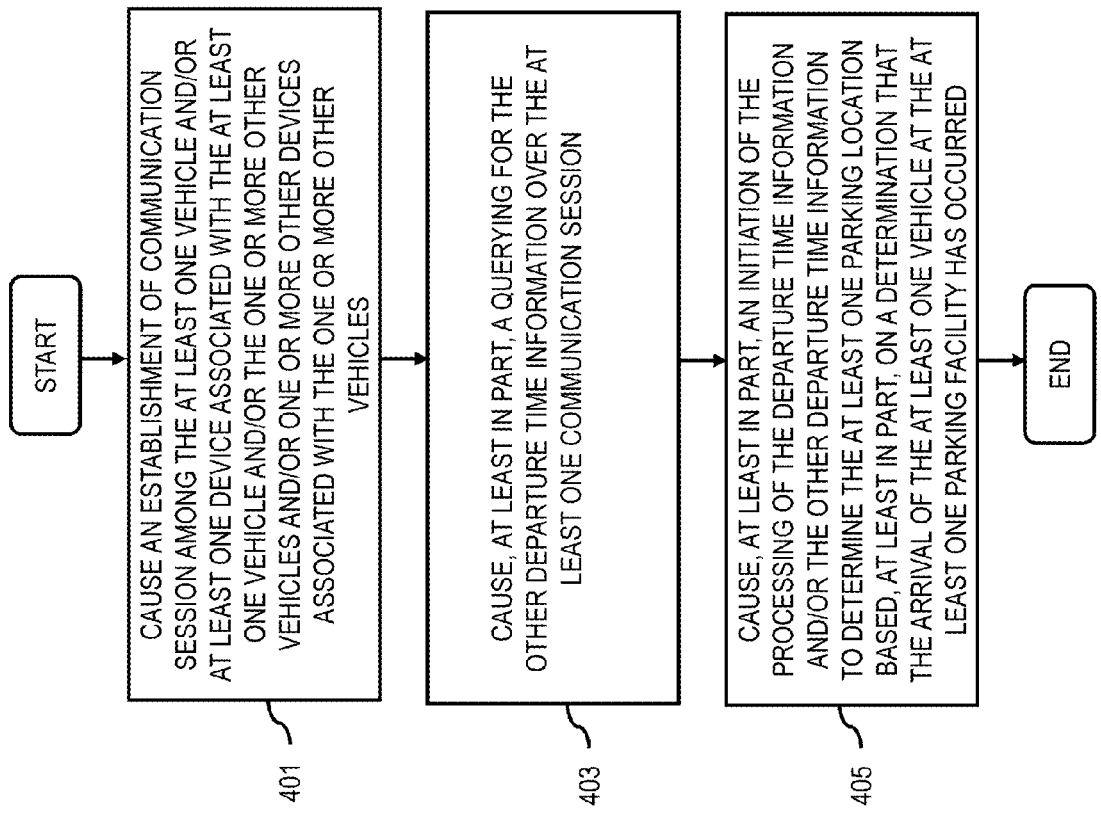

FIG. 4 is a flowchart of a process for establishing communication session among one or more vehicles and/or devices associated with the one or more vehicles for querying the departure time information, according to one embodiment. In one embodiment, the travel platform 109 performs the process 400 and is implemented in, for instance, a chip set including a processor and a memory as shown in FIG. 13.

In step 401, the travel platform 109 causes, at least in part, an establishment of at least one communication session among the at least one vehicle, at least one device associated with the at least one vehicle, the one or more other vehicles, one or more other devices associated with the one or more other vehicles, or a combination thereof. In one scenario, the travel platform 109 allows arriving vehicles to find the most suitable parking location at the at least one parking facility by initiating communication with the arriving vehicles and the parked vehicles at the at least one parking facility, thereby knowing their planned departure time and arranging the parking location for the arriving vehicles accordingly.

In step 403, the travel platform 109 causes, at least in part, a querying for the other departure time information over the at least one communication session. In one scenario, the travel platform 109 queries for departure information over the communication network for the one or more vehicles associated with the at least one parking facility, thereby processing and/or facilitating a processing of departure information provided by the one or more vehicles to determine a hierarchy of the one or more parking location based, at least in part, on the estimated time of departure. In one scenario, the travel platform 109 may position the vehicles leaving the at least one parking facility at a later time than other vehicles, at a parking location where it does not obstruct the pathway of other vehicles departing at an early time.

In step 405, the travel platform 109 causes at least in part, an initiation of the processing of the departure time information, the other departure time information, or a combination thereof to determine the at least one parking location based, at least in part, on a determination that the arrival of the at least one vehicle at the at least one parking facility has occurred. In one scenario, Steve plans a route to XYZ destination, and plans to arrive at the parking facility at 17:00. The travel platform 109 may query couple of minutes before Steve arrives at the parking facility to input an estimated time at which he plans to leave the parking facility. If Steve inputs 23:00 as his time of departure, the travel platform 109 analyzes the parking situation by using the time of departure entered by Steve and by determining the time of departure for other vehicles parked and/or arriving at the parking facility over a communication session. In one scenario, the travel platform 109 may monitor the travel information for one or more vehicles during their travel to the at least one destination, for instance, the travel platform 109 may process the time the one or more vehicles left their point of interest (e.g. home, office etc.) for the at least one destination, with the retrieved distance and speed information for the one or more vehicles, to determine whether the at least one vehicle may arrive at the estimated time of arrival.

Figure 5:
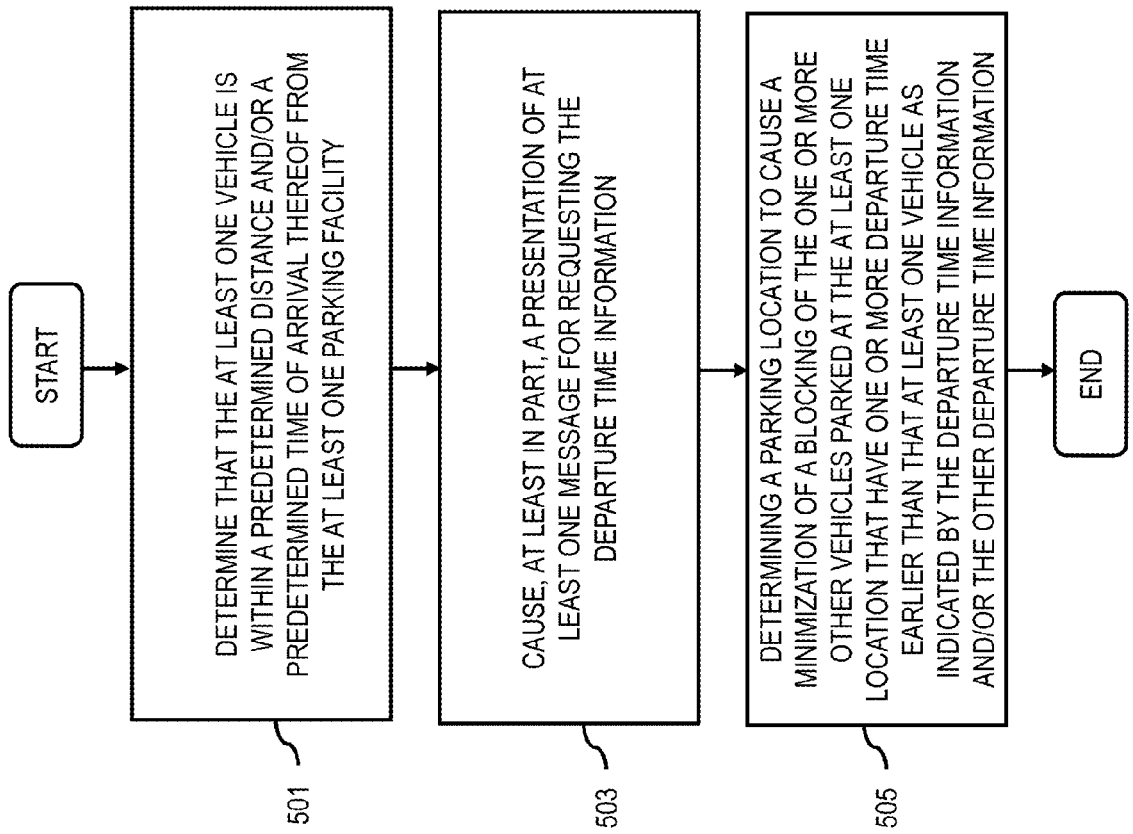

FIG. 5 is a flowchart of a process for causing a presentation of at least one message requesting the departure time information upon determination that at least one vehicle is within a predetermined distance and/or time of arrival to minimize the blocking of the one or more other vehicles with earlier departure time information, according to one embodiment. In one embodiment, the travel platform 109 performs the process 500 and is implemented in, for instance, a chip set including a processor and a memory as shown in FIG. 13.

In step 501, the travel platform 109 determines that the at least one vehicle is within a predetermined distance, a predetermined time of arrival, or a combination thereof from the at least one parking facility. In one scenario, the travel platform 109 determines one or more trace results associated with GPS receivers within a mobile device during one or more travel paths between a starting point of interest (e.g., a home or office) and the at least one parking facility. The travel platform 109 then analyzes the one or more trace results to determine whether the at least one vehicle is or may be within a predetermined distance and/or a predetermined time of arrival. In one scenario, the travel platform 109 may determine that the at least one vehicle may be arriving late at the at least one parking facility, thereby the travel platform 109 queries the user of the vehicle arriving late, whether he/she wants to update his/her time of departure from the at least one parking facility. In one scenario, the travel platform 109 may allocate the parking location of the vehicle arriving late to the other arriving vehicle based, at least in part, on their departure time information.

In step 503, the travel platform 109 causes, at least in part, a presentation of the at least one message for requesting the departure time information. In one scenario, the travel platform 109 may query the user regarding their time of departure, upon a determination that the one or more vehicles associated with the at least one parking facility is within the predetermined distance and/or time of arrival.

In step 505, the travel platform 109 determines the at least one parking location to cause, at least in part, a minimization of a blocking of the one or more other vehicles parked at the at least one location that have one or more departure times earlier than that at least one vehicle as indicated by the departure time information, the other departure time information, or a combination thereof. In one scenario, the travel platform 109 may initiate communication with the occupants (e.g., parked vehicles) of the parking locations and the arriving vehicles about the parking situation and takes decisions based, at least in part, on the acquired information, for instance, the availability of parking locations, the departure time information, the time of arrival, etc. In one scenario, the travel platform 109 may determine that the car driven by Nick is not planning to leave before midnight, thereby the travel platform may allocate Dave's car to be parked behind Nick's car, even if Dave is temporarily blocking Nick's car because Dave is leaving at 19:00.

Figure 6:
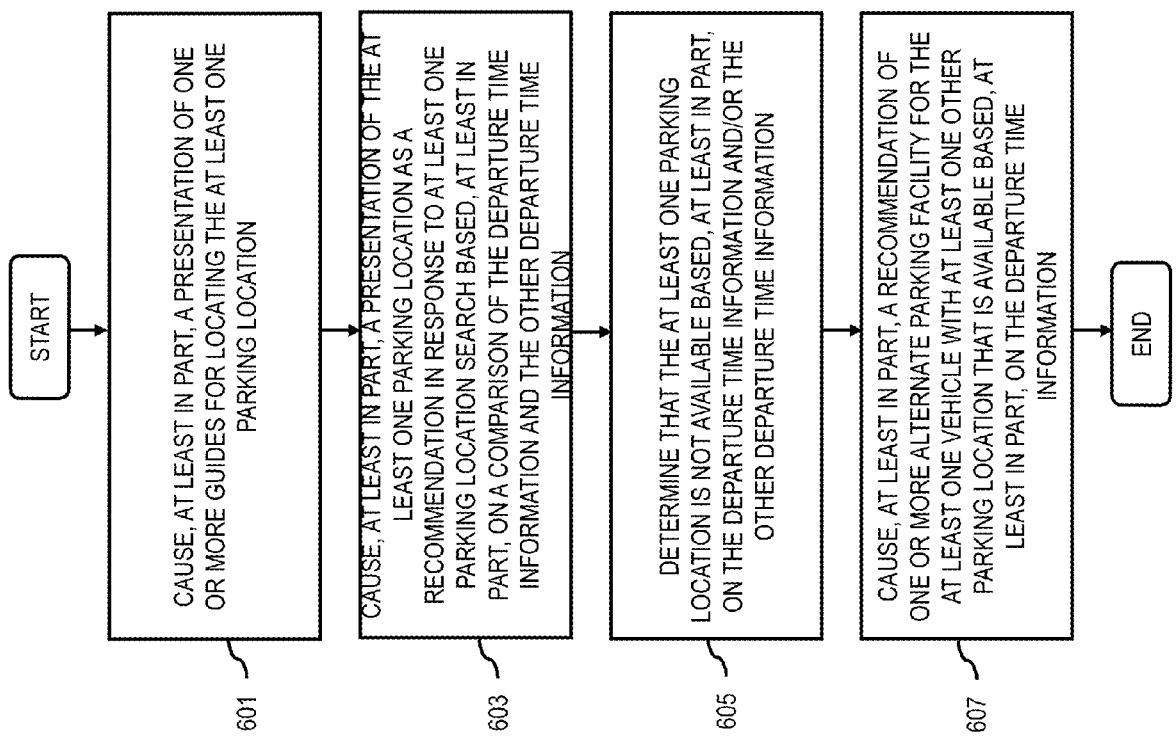

FIG. 6 is a flowchart of a process for determining availability information for at least one parking location and causing a presentation of one or more guides to the available parking location, if not, causing a recommendation of one or more alternate destinations, according to one embodiment. In one embodiment, the travel platform 109 performs the process 600 and is implemented in, for instance, a chip set including a processor and a memory as shown in FIG. 13.

In step 601, the travel platform 109 causes, at least in part, a presentation of one or more guides for locating the at least one parking location, wherein the one or more guides indicate, at least in part, a direction, an orientation, or a combination thereof associated with the at least one parking location. In one scenario, the travel platform 109 determines an availability of a parking location for a user based, at least in part, on the departure time information. Then, the travel platform may cause a presentation in the UE 101 of the user, guiding the user towards the selected parking location, by displaying the direction and orientation associated with the selected parking location in the UE 101 for user convenience. In one scenario, the travel platform 109 may cause a presentation whereby a driver may receive a message in his/her UE 101 "please drive to parking lot H343", or "park left to car LEX-654 (blue Lexus)" guiding the driver to park his/her vehicle at the suitable parking location. Further, when the driver is nearby the right parking location, the travel platform 109 may provide additional guidance, for instance, the driver may be presented with another message in his/her UE 101 "please drive 50 cm more ahead". In one scenario, the travel platform 109 may advertise the one or more suitable parking locations upon determination that the at least one vehicle is nearby the one or more suitable parking location and may provide instructions on where to and/or how to park so that leaving time criteria can be met.

In step 603, the travel platform 109 causes, at least in part, a presentation of the at least one parking location as a recommendation in response to at least one parking location search based, at least in part, on a comparison of the departure time information and the other departure time information, wherein the at least one parking location search specifies, at least in part, the departure time information. In one scenario, the travel platform 109 may cause, at least in part, an initiation of a search for a parking location for a vehicle with departure time information. The travel platform 109 may further causes, at least in part, a comparison between at least one vehicle with departure time information and other vehicles with departure time information at the one or more parking facilities, whereby the travel platform 109 may causes, at least in part, a recommendation of a parking location for the vehicles with departure time information based, at least in part, on the comparison.

In step 605, the travel platform 109 determines that the at least one parking location is not available based, at least in part, on the departure time information, the other departure time information, or a combination thereof. In one scenario, the travel platform 109 may communicate with the parked vehicles at the at least one parking facility to determine their estimated time of departure. The travel platform 109 may compare the departure time of the parked vehicle with the estimated time of arrival and the time of departure of the arriving vehicles, and determine at least one parking location.

In step 607, the travel platform 109 causes, at least in part, a recommendation of one or more alternate parking facility for the at least one vehicle with at least one other parking location that is available based, at least in part, on the departure time information. In one scenario, the travel platform 109 may determine that the at least one parked vehicle has exceeded their time of departure, thereby the space is no longer available for the arriving vehicle. The travel platform 109 may recommend an alternative parking location at an alternate parking facility. In another scenario, the travel platform 109 may determine that the parking location at the at least one parking facility is fully occupied, whereby the travel platform 109 may recommend an alternative parking location.

Figure 7:
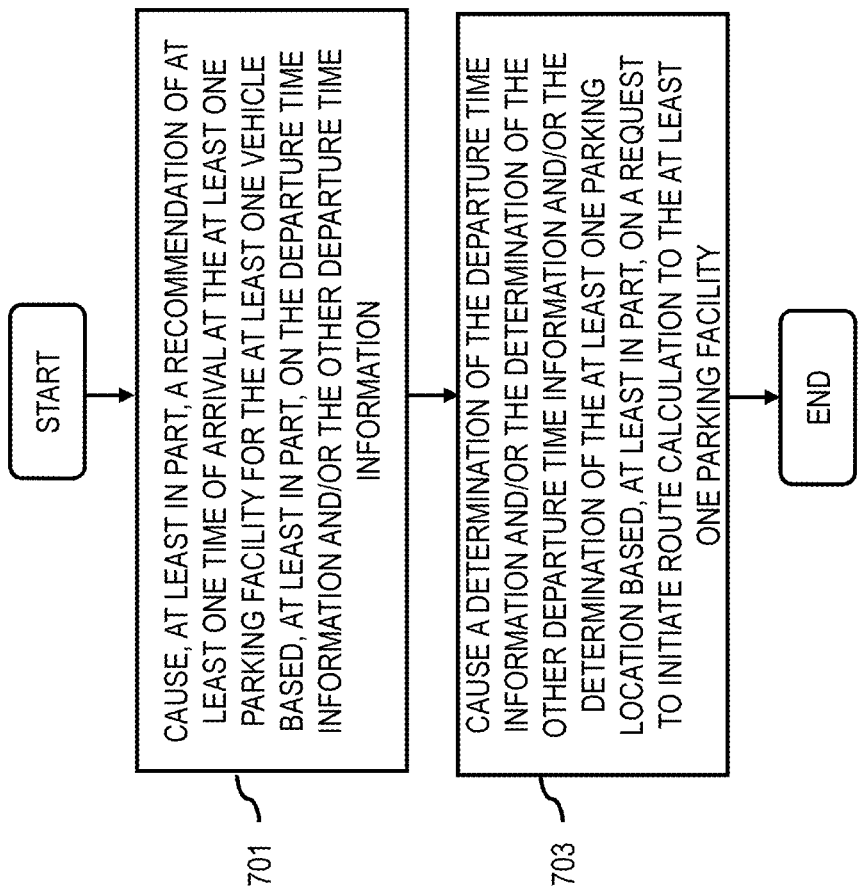

FIG. 7 is a flowchart of a process for initiation of the determination of the departure time information and causing a recommendation of at least one time of arrival based on the departure time information, according to one embodiment. In one embodiment, the travel platform 109 performs the process 700 and is implemented in, for instance, a chip set including a processor and a memory as shown in FIG. 13

In step 701, the travel platform 109 causes, at least in part, a recommendation of at least one time of arrival at the at least one parking facility for the at least one vehicle based, at least in part, on the departure time information, the other departure time information, or a combination thereof. In one scenario, the travel platform 109 may recommend one or more vehicles to arrive at a particular time at the at least one parking facility, the recommended arriving time may correspond to the departing time for one or more parked vehicles.

In step 703, the travel platform 109 causes, at least in part, an initiation of the determination of the departure time information, the determination of the other departure time information, the determination of the at least one parking location, or a combination thereof based, at least in part, on a request to initiate a route calculation to the at least one parking facility. In one scenario, a user may plan a route to a destination, whereby he/she enters the destination information. The travel platform 109 may initiate the determination of the departure time information and the parking location before and/or during the route calculation to the at least one parking facility.

Figure 8:
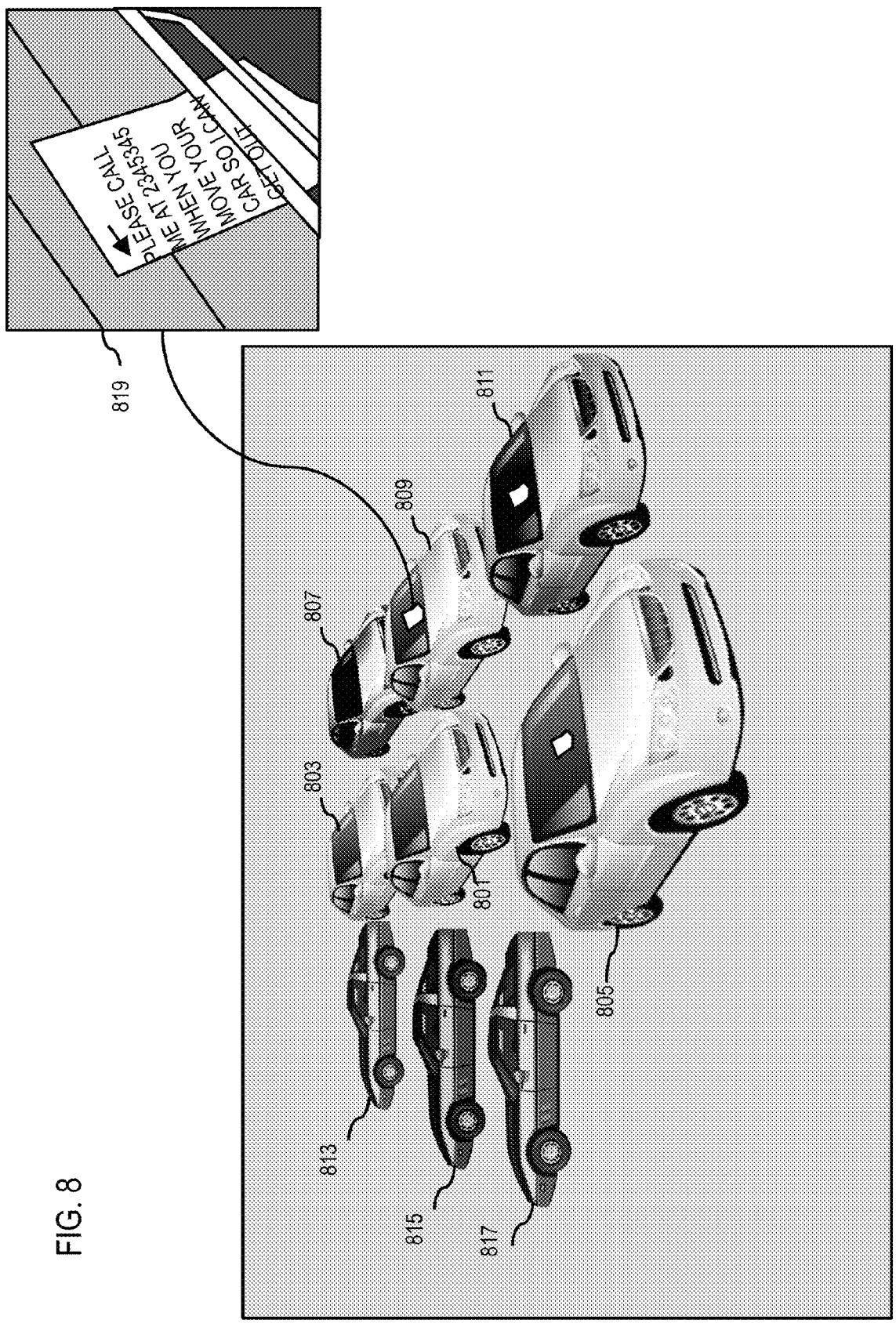
FIG. 8 is a diagram that illustrates a problem faced by users as a result of disorganized parking utilized in the process of FIGS. 3-7, according to one embodiment.

FIG. 8 is a diagram that illustrates a problem faced by users as a result of disorganized parking utilized in the process of FIGS. 3-7, according to one embodiment. In one scenario, users may park by order of their arrival, such random parking leads to people being blocked at one or more parking facility. In FIG. 8, an owner parks his car (801) on a vacant space upon his/her arrival at the parking location, at a later point of time when the owner needs to leave the venue, he/she finds out that his/her car is surrounded by cars on the right (813, 815, 817), on the left (807, 809 and 811), at the back (803) and in the front (805). The available option for the owner of the car (801) is to request the respective drivers of the cars blocking his/her path to move their cars, so that he/she can leave. However, if the drivers of the vehicles blocking his/her path are not reachable, the only available option is to leave a note on their cars to contact the owner when they move their car (819). This process is tedious and substandard because there is no departure information on the other vehicles.

Figure 9:
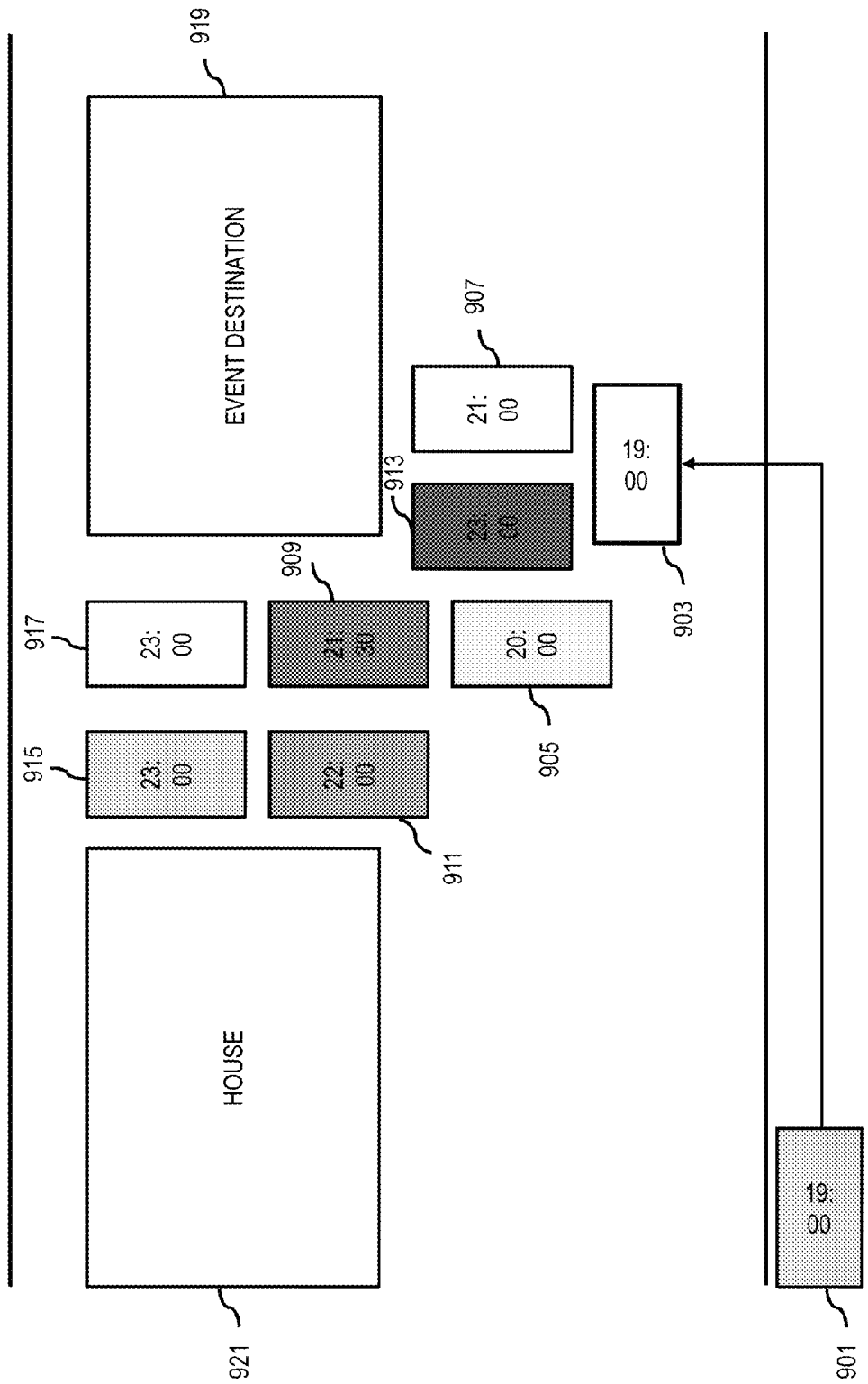
FIG. 9 is a diagram of a user interface utilized in the process of FIGS. 3-7, according to one embodiment.

FIG. 9 is a diagram of a user interface utilized in the process of FIGS. 3-7, according to one embodiment. In FIG. 9 a user is suggested a parking location at one or more parking facility based on his departure time. In one scenario, an owner of the car (901) plans a route to a destination (919), and decides to arrive at the parking facility by 16:00. Few minutes before arrival, the UE 101 queries owner of the car (901) whether he/she wants to input an estimated time of departure from the parking facility, whereby the owner inputs 19:00 as the departure time because he/she does not want to be home too late. At the parking facility, the travel platform 109 analyzes the parking situation by using the time of departure previously entered by the owner (19:00) and establishes communication with other cars parked at the parking facility and queries their planned departure. In one scenario, the owners of other cars enters their estimated time of departure as 23:00, since these cars are the last to depart they are placed at the parking location 913, 915 and 917, in a manner that they do not obstruct the entry and/or exit of other vehicles. The car 901 is parked at parking location 903 because car 901 is the first to depart from the parking facility and does not obstruct cars parked at 913 and 907 because these cars are departing at a later time, 23:00 and 21:00 respectively. In the similar manner, other cars are placed in accordance to their departure time information.

Figure 10:
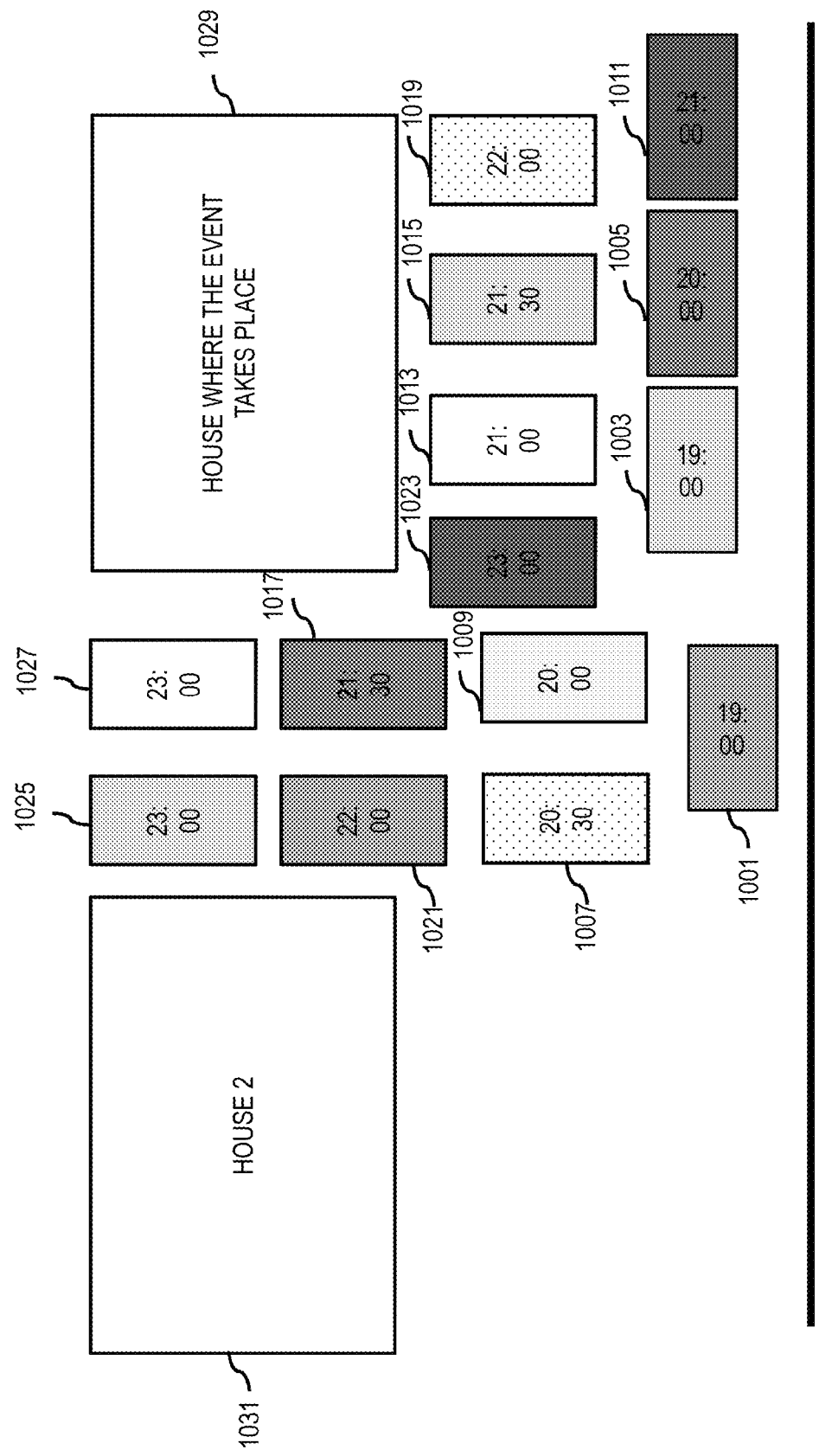
FIG. 10 is a diagram that represents a fully optimized parking situation utilized in the process of FIGS. 3-7, according to one embodiment.

FIG. 10 is a diagram that represents a fully optimized parking situation utilized in the process of FIGS. 3-7, according to one embodiment. In one scenario, the entire participants to an event at the at least one destination may arrive by their estimated time of arrival, and are placed in the parking location associated with the at least one parking facility based on their time of departure. In one scenario, the travel platform 109 communicates with one or more vehicles associated with the at least one parking facility in relation to their travel information, parking arrangements, or a combination thereof. In one scenario, the travel platform 109 processes the gathered information for one or more vehicles arriving and/or parked at the at least one parking location associated with the at least one parking facility to determine a hierarchy of the one or more parking positions based, at least in part, on the estimated time of departure. In FIG. 10 the vehicles that are leaving the last are placed at parking locations 1023, 1025 and 1027 ensuring that they do not block other vehicles leaving early. In one scenario, the travel platform 109 places the vehicles that are departing the earliest at parking locations 1001 and 1003, knowing that vehicles parked at parking locations 1005, 1007, 1009, 1011, 1013, 1015, 1017, 1019, 1021, 1023 are not planning to leave before the cars parked at the parking locations 1001 and 1003. Therefore, cars leaving the earliest may be parked at parking location 1001 and 1003 behind other cars, even if it is blocking other cars. This process utilizes limited parking location to the optimum ensuring user satisfaction.

Figure 11A:
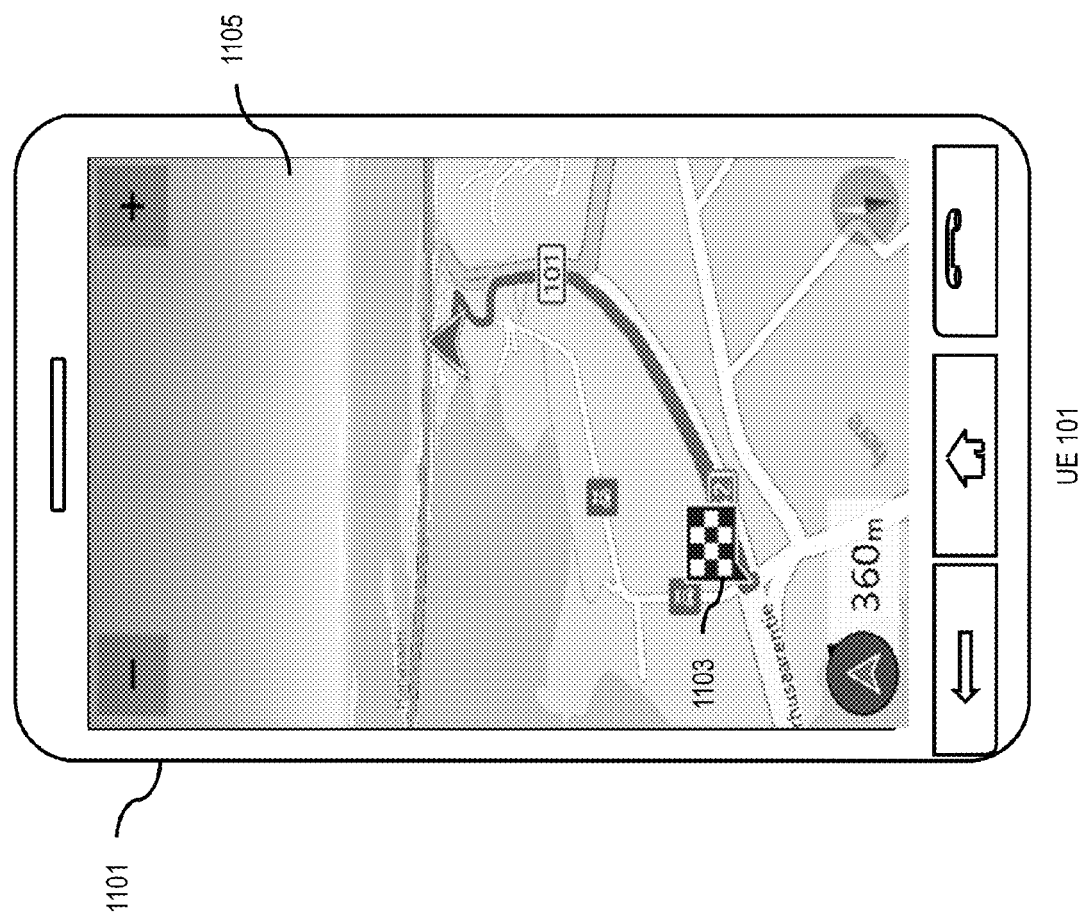
FIG. 11A-11B are diagrams of user interfaces utilized in the processes of FIG. 3-7, according to one embodiment.
Figure 11:
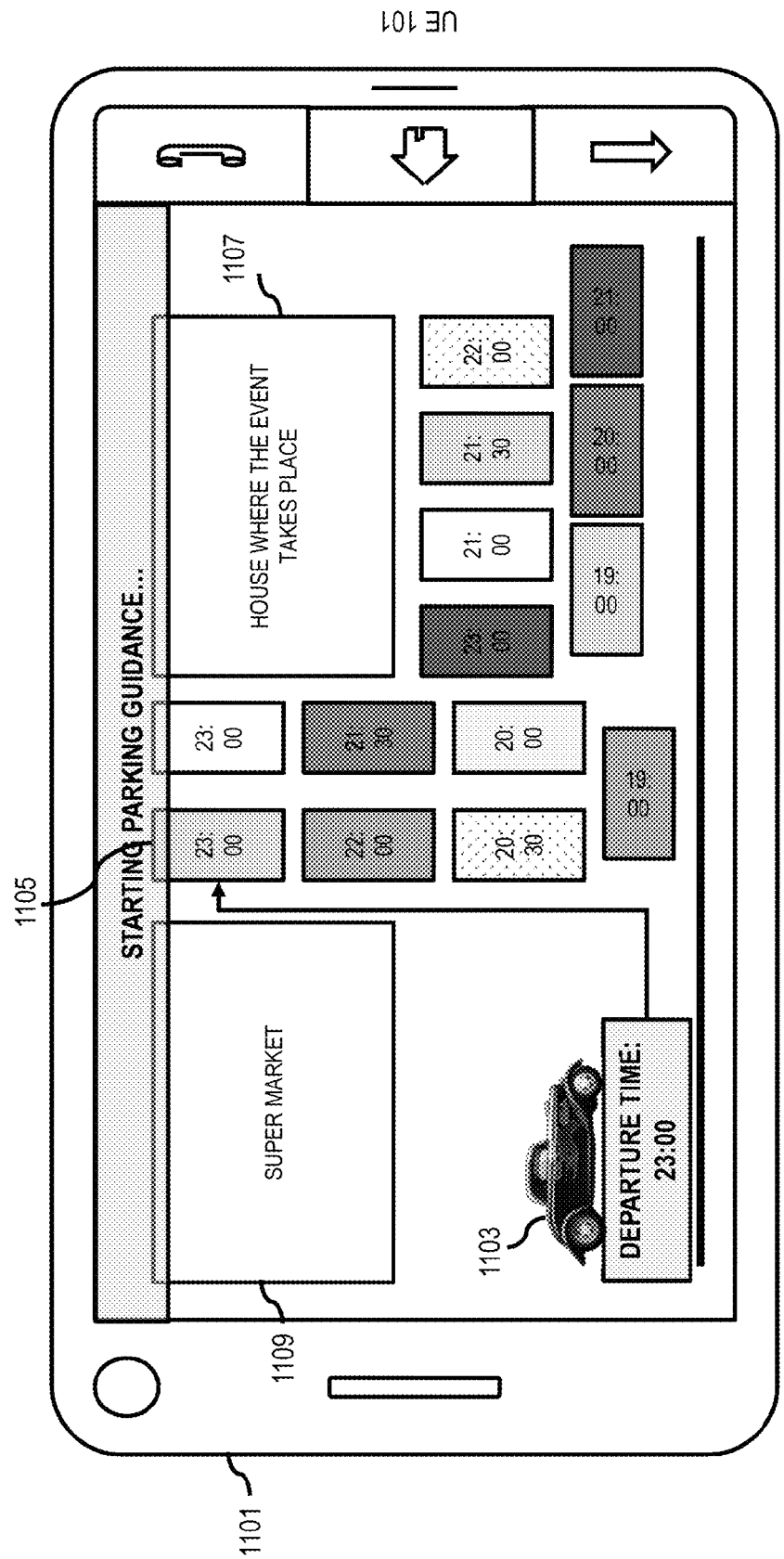

FIG. 11 A is a diagram of a user interface utilized in the process of FIGS. 3-7, according to one embodiment. FIG. 11 A represents a scenario whereby a user is navigating to a destination (represented by the checkered flag 1103). When the vehicle is approaching the destination, the driver may tap the display, for instance, the checkered flag 1103 or other areas in the display (1105), whereby the travel platform 109 causes a presentation described in FIG. 11 B. The display of the checkered flag (1103) guides a driver to a destination, and based on driver's response, the travel platform 109 may provide a comprehensive guidance, as provided in FIG. 11 B, in relation to the information for a parking facility. In one scenario, a more user friendly approach may be implemented whereby the user need not interact with the display presented in the UE 101 (1103, 1105), the travel platform may cause a presentation of information relating to a parking facility upon determining that the vehicle is nearing or is within a parking facility. In this manner, the UE 101 may change its view from FIG. 11 A to FIG. 11 B without user interaction, thereby enhancing user convenience. In one scenario, a vehicle may establish connection between the parked vehicles and/or devices of the drivers of the parked vehicles and may initiate to clarify and/or negotiate the parking situation. The devices and vehicles may have applications running which enables answering of the queries of the incoming vehicle and/or device associated with the incoming vehicle. Further, the incoming vehicles may be directed to other services to get the needed information about departure time for the parked vehicles, for instance, vehicles informs their time of departure upon or before arrival at a parking facility. The time of departure may be updated by the drivers of the parked vehicles upon change in their plans, whereby the travel platform 109 updates the calendar information. In one scenario, parking arrangement for vehicles at a parking facility may be automated, whereby the driver need not use parking assistance or other guidance programs. For instance, drivers of parked vehicles may provide their departure time information, whereby the program in the vehicles may analyze the information and may calculate the needed changes to be done, respectively. Thereby, the car may change its parking place based on that analyzed information, if needed.

FIG. 11 B is a diagram of a user interface utilized in the process of FIGS. 3-7, according to one embodiment. In one scenario, the travel platform 109 causes a presentation (1101) of the at least one suitable parking position (1105) from the one or more parking location associated with the at least one parking facility based, at least in part, on the estimated time of departure. Accordingly, the travel platform 109 causes a presentation of one or more guides for one or more users (1103), wherein the one or more guides indicate, at least in part, a direction, an orientation, or a combination thereof to park one or more vehicles at the suitable parking position. In one scenario, the travel platform 109 monitors location information for one or more vehicles associated with the at least one parking facility and/or causes a recommendation of at least one alternate parking location associated with the at least one parking facility. In one scenario, the travel platform 109 determines there are no parking location vacant due to unforeseen circumstances, for instance, vehicles surpasses their time of departure, whereby the travel platform 109 searches for alternative parking facility nearby the event destination (1107). In one scenario, the travel platform 109 may determine a parking location in point of interest 1109.

The processes described herein for determining at least one parking location for at least one vehicle at the at least one parking facility based, at least in part, on departure time information for one or more vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
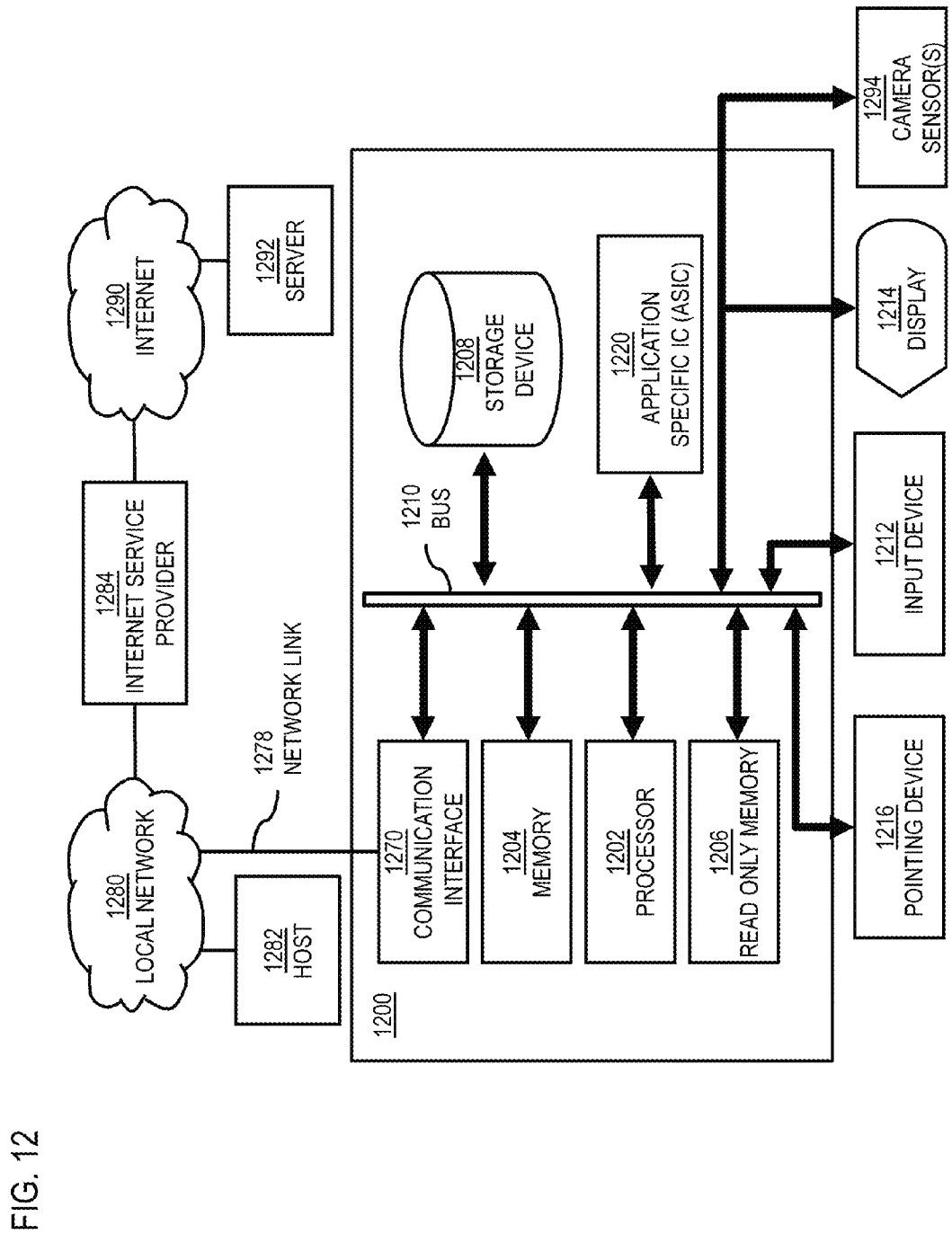
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to determine at least one parking location for at least one vehicle at the at least one parking facility based, at least in part, on departure time information for one or more vehicles as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of determining at least one parking location for at least one vehicle at the at least one parking facility based, at least in part, on departure time information for one or more vehicles.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to determine at least one parking location for at least one vehicle at the at least one parking facility based, at least in part, on departure time information for one or more vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for determining at least one parking location for at least one vehicle at the at least one parking facility based, at least in part, on departure time information for one or more vehicles. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for determining at least one parking location for at least one vehicle at the at least one parking facility based, at least in part, on departure time information for one or more vehicles, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for determining at least one parking location for at least one vehicle at the at least one parking facility based, at least in part, on departure time information for one or more vehicles to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to determine at least one parking location for at least one vehicle at the at least one parking facility based, at least in part, on departure time information for one or more vehicles as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of determining at least one parking location for at least one vehicle at the at least one parking facility based, at least in part, on departure time information for one or more vehicles.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to determine at least one parking location for at least one vehicle at the at least one parking facility based, at least in part, on departure time information for one or more vehicles. The memory 1305 also stores the data associated with or generated by the execution of the inventive steps.

Figure 14:
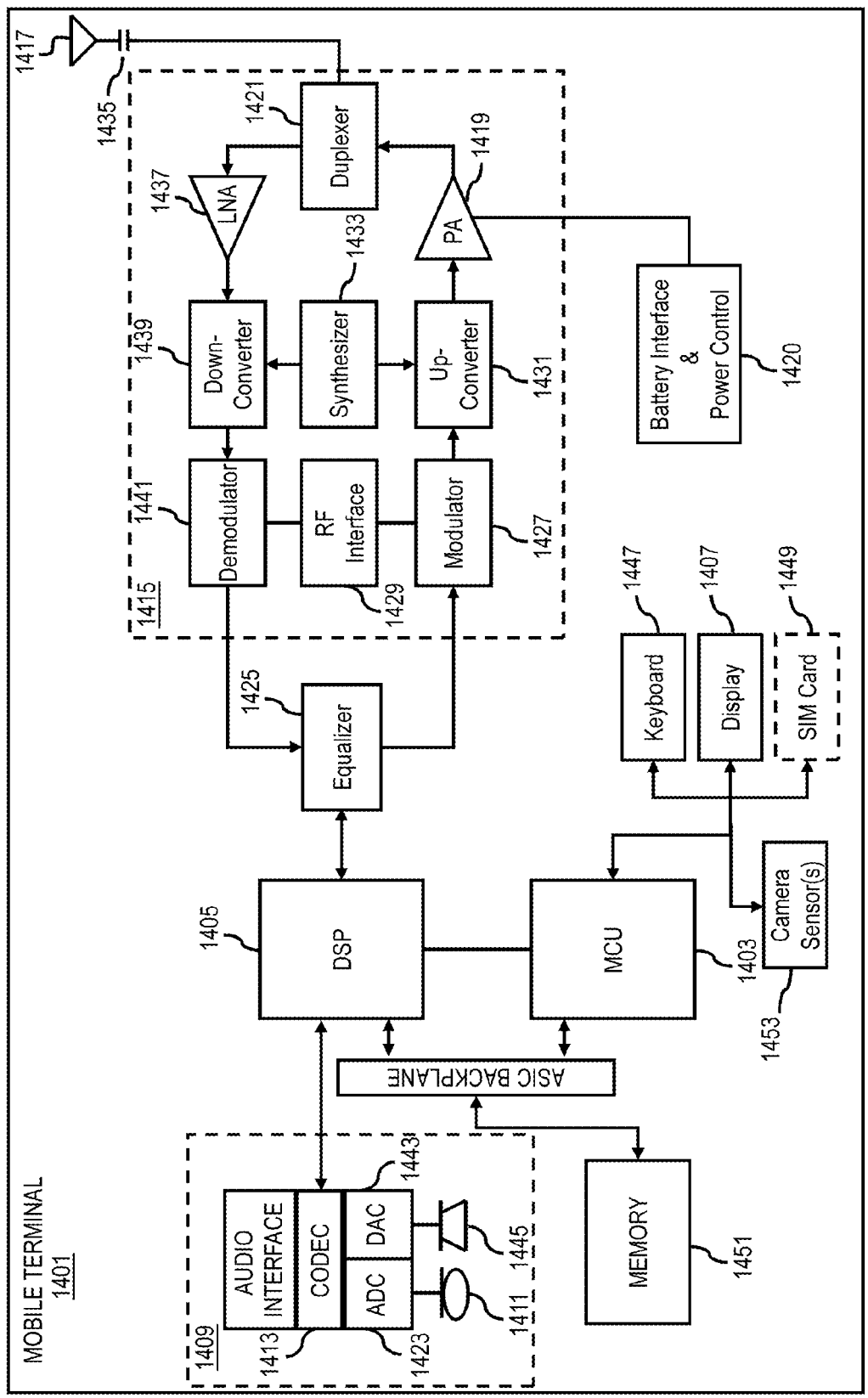
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of determining at least one parking location for at least one vehicle at the at least one parking facility based, at least in part, on departure time information for one or more vehicles. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of determining at least one parking location for at least one vehicle at the at least one parking facility based, at least in part, on departure time information for one or more vehicles. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to determine at least one parking location for at least one vehicle at the at least one parking facility based, at least in part, on departure time information for one or more vehicles. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising facilitating a processing of and/or processing (1) data and/or (2) information and/or (3) at least one signal, the (1) data and/or (2) information and/or (3) at least one signal based, at least in part, on the following:
    at least one determination of departure time information for at least one vehicle from at least one parking facility, wherein the departure time information is determined prior to an arrival of the at least one vehicle at the at least one parking facility, the determination of the departure time information of the at least one vehicle being associated with at least one network communication;
    at least one determination of other departure time information for one or more other vehicles parked at the at least one parking facility, the other departure time information determined according to at least one other network communication, the at least one other network communication in response to the at least one network communication; and
    a processing of the departure time information, the other departure time information, or a combination thereof to determine at least one parking location for the at least one vehicle at the at least one parking facility.

2. A method of claim 1, wherein the (1) data and/or (2) information and/or (3) at least one signal are further based, at least in part, on the following:
    an establishment of at least one communication session among the at least one vehicle, at least one device associated with the at least one vehicle, the one or more other vehicles, one or more other devices associated with the one or more other vehicles, or a combination thereof; and
    a querying for the other departure time information over the at least one communication session.

3. A method of claim 1, wherein the (1) data and/or (2) information and/or (3) at least one signal are further based, at least in part, on the following:
- an initiation of the processing of the departure time information, the other departure time information, or a combination thereof to determine the at least one parking location based, at least in part, on a determination that the arrival of the at least one vehicle at the at least one parking facility has occurred.

4. A method of claim 1, wherein the (1) data and/or (2) information and/or (3) at least one signal are further based, at least in part, on the following:
- at least one determination that the at least one vehicle is within a predetermined distance, a predetermined time of arrival, or a combination thereof from the at least one parking facility; and
- a presentation of at least one message for requesting the departure time information.

5. A method of claim 1, wherein the (1) data and/or (2) information and/or (3) at least one signal are further based, at least in part, on the following:
- at least one determination of the at least one parking location to cause, at least in part, a minimization of a blocking of the one or more other vehicles parked at the at least one location that have one or more departure times earlier than that at least one vehicle as indicated by the departure time information, the other departure time information, or a combination thereof.

6. A method of claim 1, wherein the (1) data and/or (2) information and/or (3) at least one signal are further based, at least in part, on the following:
- a presentation of one or more guides for locating the at least one parking location.

7. A method of claim 1, wherein the (1) data and/or (2) information and/or (3) at least one signal are further based, at least in part, on the following:
- a presentation of the at least one parking location as a recommendation in response to at least one parking location search based, at least in part, on a comparison of the departure time information and the other departure time information,
- wherein the at least one parking location search specifies, at least in part, the departure time information.

8. A method of claim 1, wherein the (1) data and/or (2) information and/or (3) at least one signal are further based, at least in part, on the following:
- at least one determination that the at least one parking location is not available based, at least in part, on the departure time information, the other departure time information, or a combination thereof and
- a recommendation of one or more alternate parking facility for the at least one vehicle with at least one other parking location that is available based, at least in part, on the departure time information.

9. A method of claim 1, wherein the (1) data and/or (2) information and/or (3) at least one signal are further based, at least in part, on the following:
- a recommendation of at least one time of arrival at the at least one parking facility for the at least one vehicle based, at least in part, on the departure time information, the other departure time information, or a combination thereof.

10. A method of claim 1, wherein the (1) data and/or (2) information and/or (3) at least one signal are further based, at least in part, on the following:
- an initiation of the determination of the departure time information, the determination of the other departure time information, the determination of the at least one parking location, or a combination thereof based, at least in part, on a request to initiate a route calculation to the at least one parking facility.

11. An apparatus comprising:
- at least one processor; and
- at least one memory including computer program code for one or more programs,
- the at least one memory and the computer program code configured to, with the at least one processor, cause the apparatus to perform at least the following,
- determine departure time information for at least one vehicle from at least one parking facility, wherein the departure time information is determined prior to an arrival of the at least one vehicle at the at least one parking facility, the determination of the departure time information of the at least one vehicle being associated with at least one network communication;
- determine other departure time information for one or more other vehicles parked at the at least one parking facility, the other departure time information determined according to at least one other network communication, the at least one other network communication in response to the at least one network communication; and
- process and/or facilitate a processing of the departure time information, the other departure time information, or a combination thereof to determine at least one parking location for the at least one vehicle at the at least one parking facility.

12. An apparatus of claim 11, wherein the apparatus is further caused to:
- cause, at least in part, an establishment of at least one communication session among the at least one vehicle, at least one device associated with the at least one vehicle, the one or more other vehicles, one or more other devices associated with the one or more other vehicles, or a combination thereof; and
- cause, at least in part, a querying for the other departure time information over the at least one communication session.

13. An apparatus of claim 11, wherein the apparatus is further caused to:
- cause, at least in part, an initiation of the processing of the departure time information, the other departure time information, or a combination thereof to determine the at least one parking location based, at least in part, on a determination that the arrival of the at least one vehicle at the at least one parking facility has occurred.

14. An apparatus of claim 11, wherein the apparatus is further caused to:
- determine that the at least one vehicle is within a predetermined distance, a predetermined time of arrival, or a combination thereof from the at least one parking facility; and
- cause, at least in part, a presentation of at least one message for requesting the departure time information.

15. An apparatus of claim 11, wherein the apparatus is further caused to:
- determine the at least one parking location to cause, at least in part, a minimization of a blocking of the one or more other vehicles parked at the at least one location that have one or more departure times earlier than that at least one vehicle as indicated by the departure time information, the other departure time information, or a combination thereof.

16. An apparatus of claim 11, wherein the apparatus is further caused to:

cause, at least in part, a presentation of one or more guides for locating the at least one parking location.

17. An apparatus of claim 11, wherein the apparatus is further caused to:
cause, at least in part, a presentation of the at least one parking location as a recommendation in response to at least one parking location search based, at least in part, on a comparison of the departure time information and the other departure time information,
wherein the at least one parking location search specifies, at least in part, the departure time information.

18. An apparatus of claim 11, wherein the apparatus is further caused to:
determine that the at least one parking location is not available based, at least in part, on the departure time information, the other departure time information, or a combination thereof and
cause, at least in part, a recommendation of one or more alternate parking facility for the at least one vehicle with at least one other parking location that is available based, at least in part, on the departure time information.

19. An apparatus of claim 11, wherein the apparatus is further caused to:
cause, at least in part, a recommendation of at least one time of arrival at the at least one parking facility for the at least one vehicle based, at least in part, on the departure time information, the other departure time information, or a combination thereof.

20. An apparatus of claim 11, wherein the apparatus is further caused to:
cause, at least in part, an initiation of the determination of the departure time information, the determination of the other departure time information, the determination of the at least one parking location, or a combination thereof based, at least in part, on a request to initiate a route calculation to the at least one parking facility.

* * * * *